May 10, 1960 E. G. SHAFFSTALL 2,936,065
SPACER SELECTOR FOR AUTOMATICALLY OPERATED
SLUG LINECASTING MACHINES
Filed Jan. 30, 1959 7 Sheets-Sheet 3
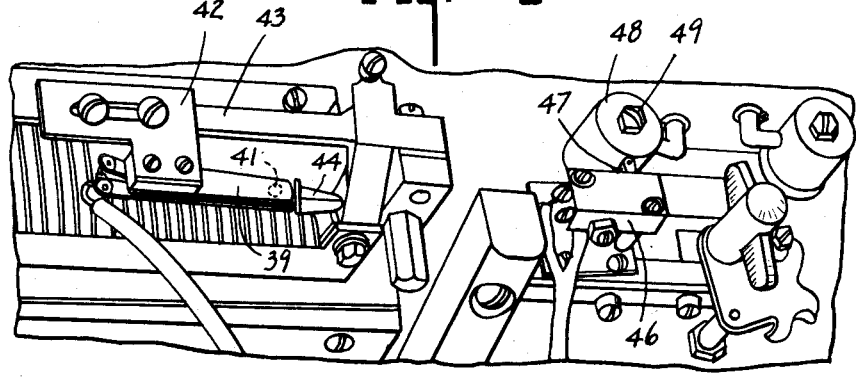
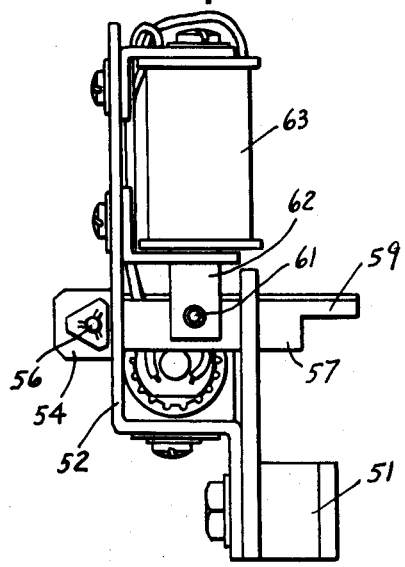
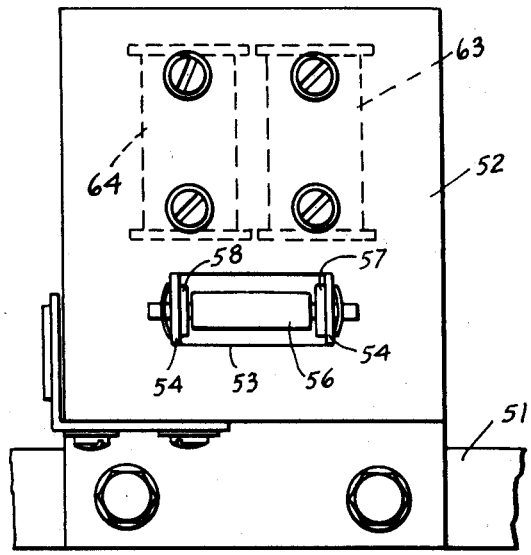
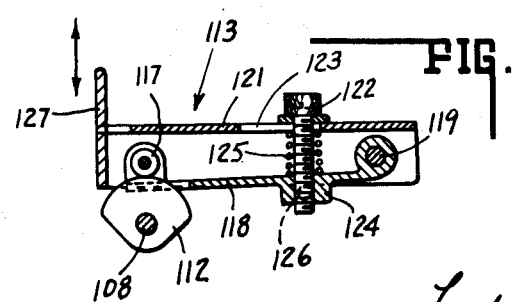
INVENTOR.
EVERETT G. SHAFFSTALL.
BY
Lockwood, Galt, Woodard + Smith.
ATTORNEYS.

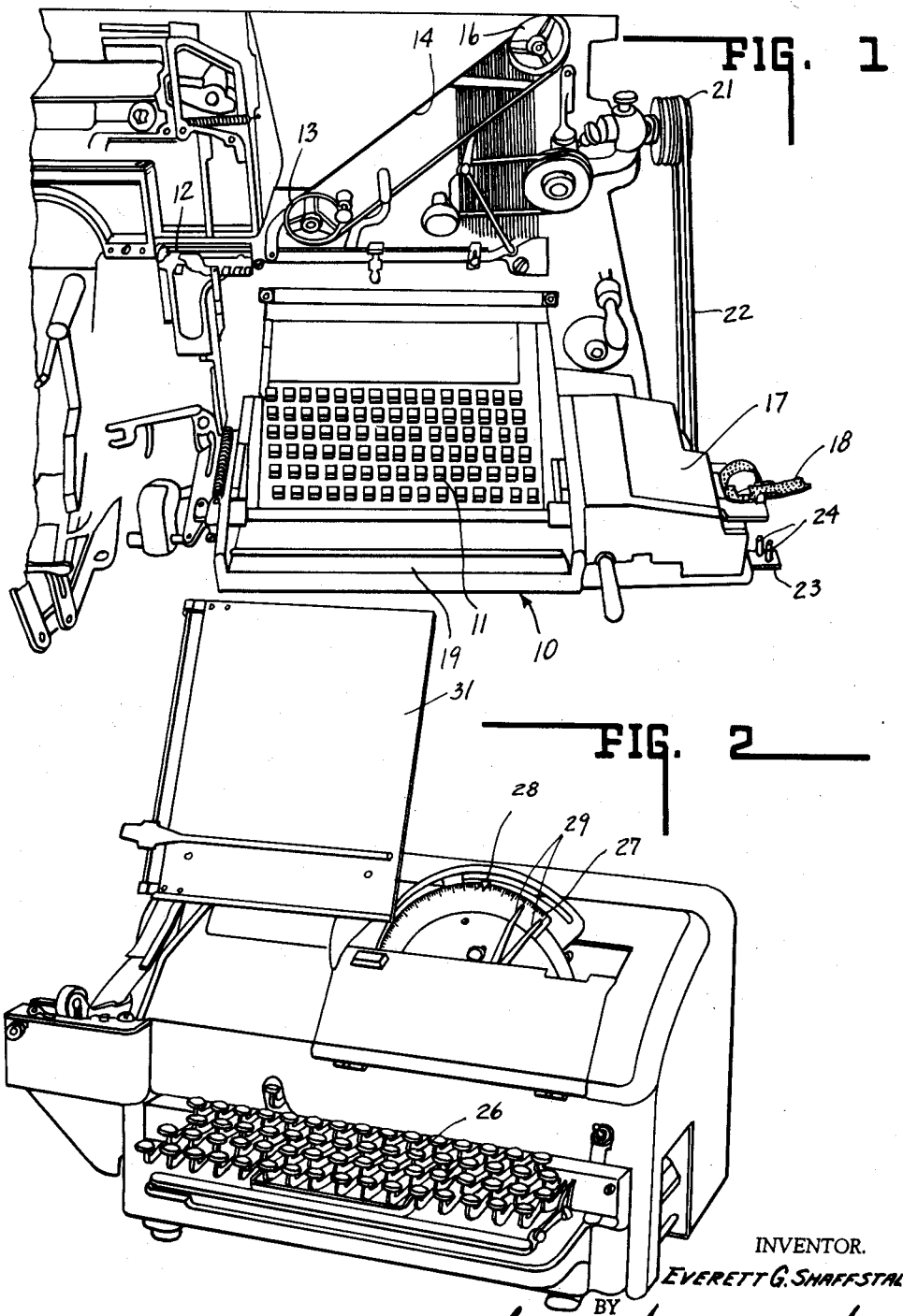

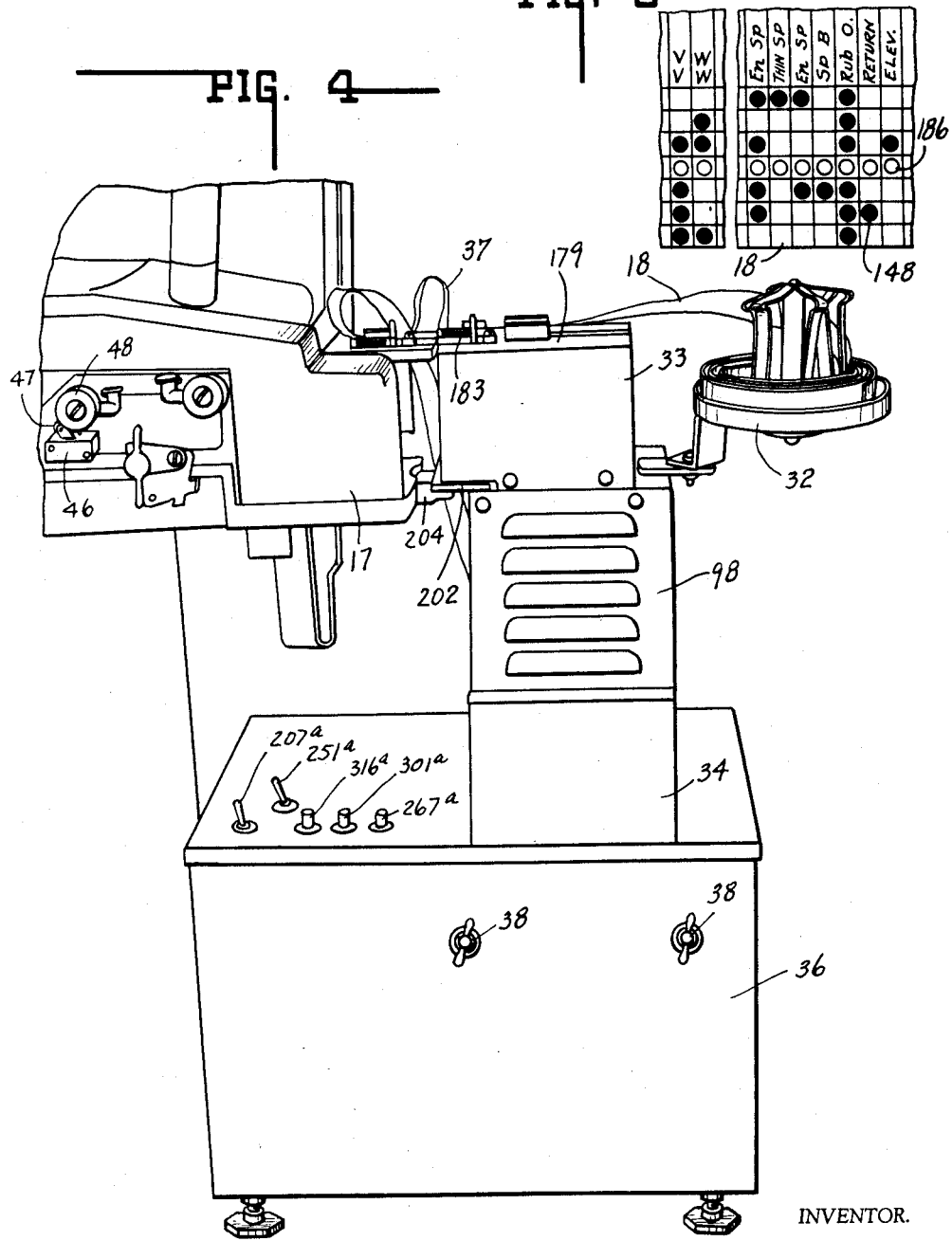

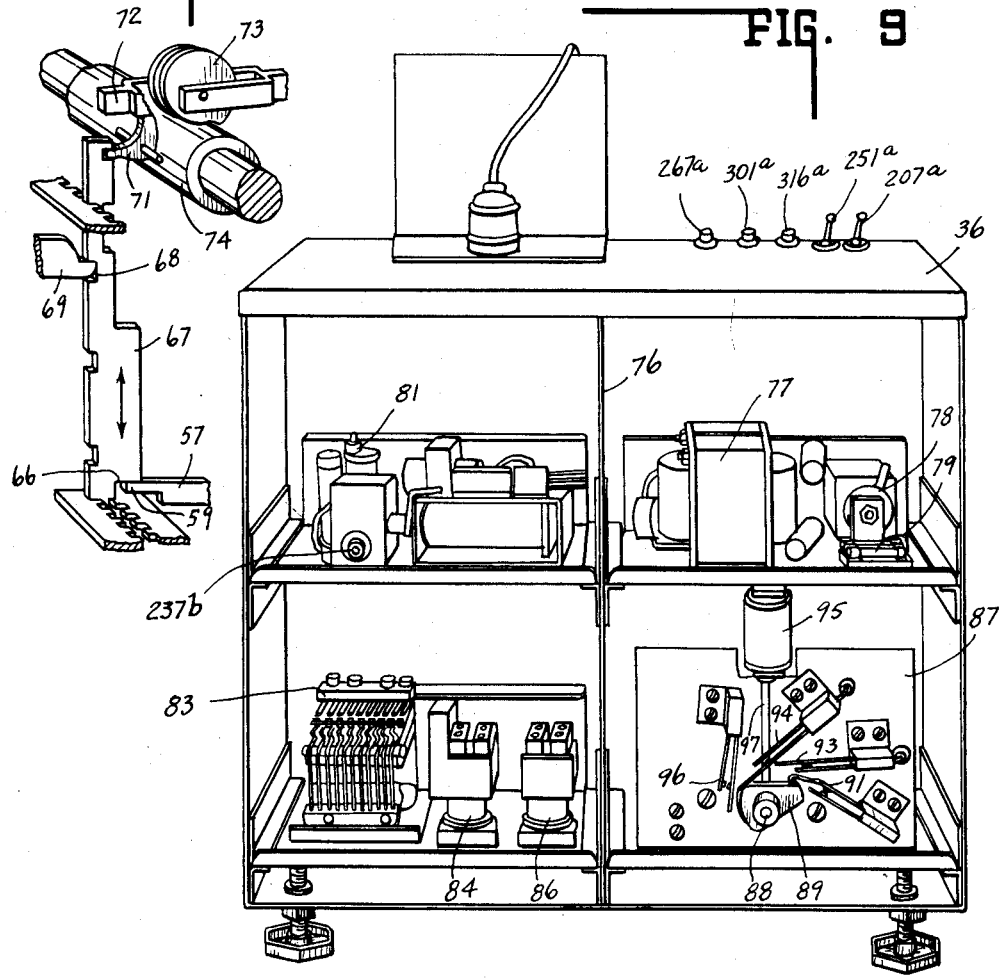

INVENTOR.
EVERETT G. SHAFFSTALL.
BY
Lockwood, Galt, Woodard + Smith.
ATTORNEYS.

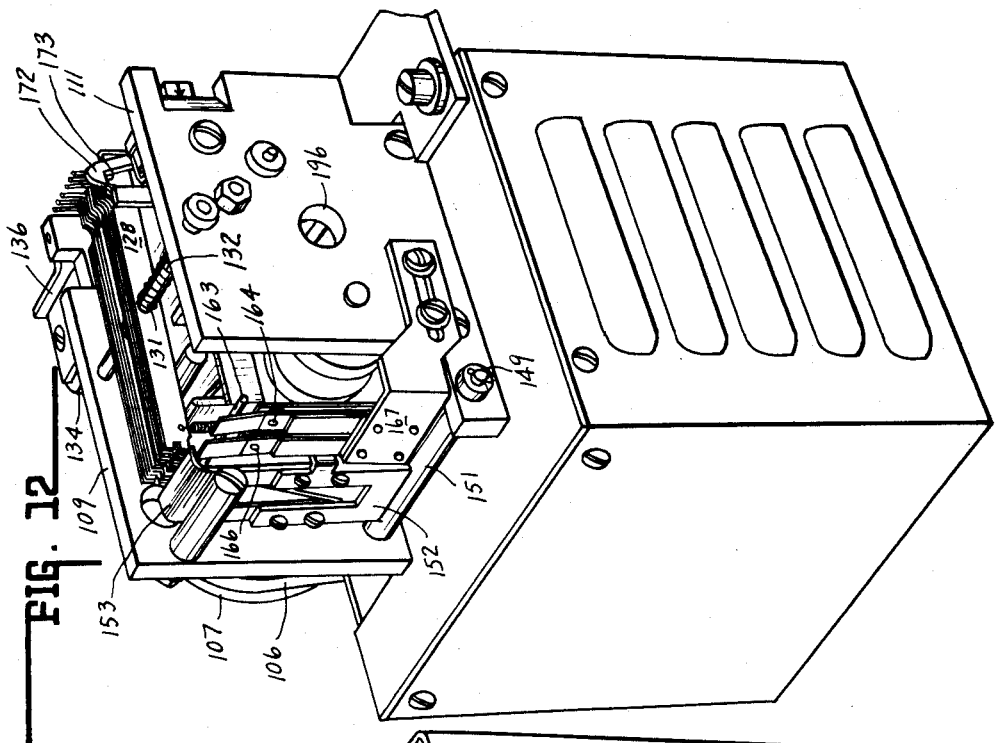
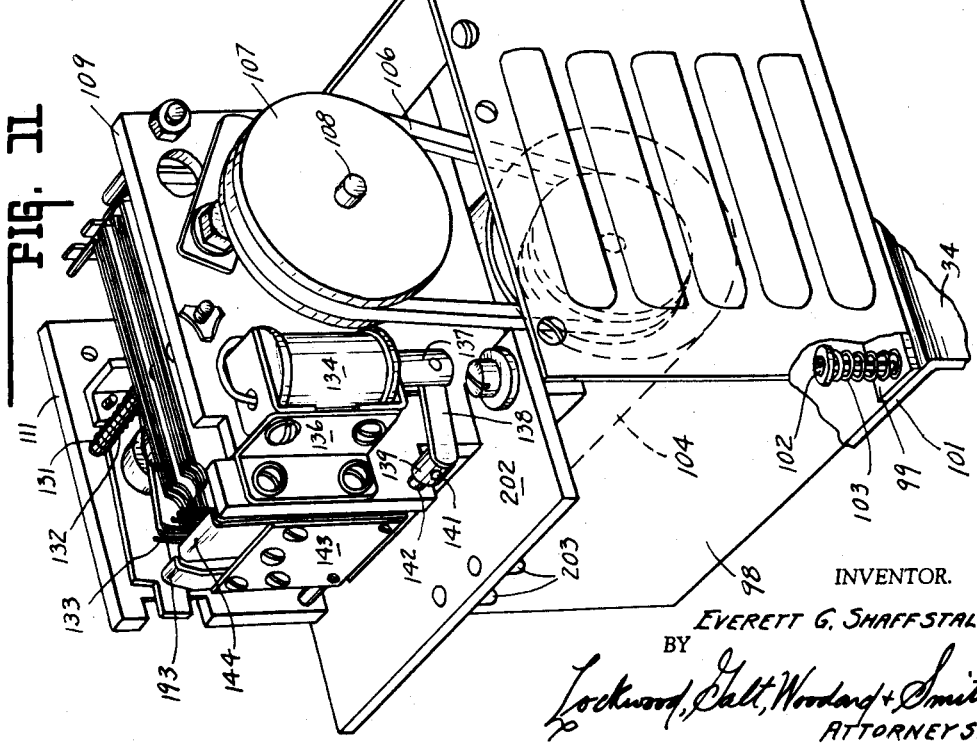
INVENTOR.
EVERETT G. SHAFFSTALL.
BY
Lockwood, Galt, Woodard + Smith.
ATTORNEYS.

INVENTOR.
EVERETT G. SHAFFSTALL.
BY
Lockwood, Galt, Woodard & Smith.
ATTORNEYS.

United States Patent Office 2,936,065
Patented May 10, 1960

2,936,065

SPACER SELECTOR FOR AUTOMATICALLY OPERATED SLUG LINECASTING MACHINES

Everett G. Shaffstall, Indianapolis, Ind., assignor to Shaffstall Equipment, Inc., Indianapolis, Ind., a corporation Application January 30, 1959, Serial No. 790,216

14 Claims. (Cl. 199—18)

The principal object of the present invention is to provide an apparatus for automatically inserting additional spacebands in the assembly of a line of type in a slug linecasting machine, and in particular to an apparatus of this type adapted for use with an automatic operating attachment for a linecasting machine which is controlled by a perforated tape input.

To speed up and render more convenient the setting of type by slug linecasting machines, it has become conventional to provide such machines with attachment devices which automatically operate the linecasting machine. The matrix or mat releasing mechanism of a machine provided with such an attachment device is operated in response to a perforated tape fed into the attachment rather than by direct manual operation of the linecasting machine keyboard by an operator. These attachments permit operation of the linecasting machine at high speeds and permit the controlling tape to be perforated in advance of operation of the linecasting machine by a tape perforating machine operator at a location remote from the linecasting machine.

The present invention is directed to a space band inserting apparatus which is described as incorporated into a conventional Mergenthaler Linotype machine having a teletypesetter attachment for automatically operating the Linotype machine. The present invention is so described since the Linotype and teletypesetter are the most common forms of slug linecasting machines and automatic operating attachments respectively. It will be understood that the invention could be used with machines other than Linotype machines equipped with teletypesetter attachments, provided that these alternative machines are equipped with similar component parts.

The operation of the Linotype machine and of the teletypesetter are not described in detail herein since these devices themselves are well known in the art and are but environment for the present invention. Detailed texts on the operation of the Linotype machine are commonly available, one such being the Official Manual of Linotype Machine Principles, published by Mergenthaler Linotype Company, Brooklyn, New York, in 1940. The teletypesetter attachment is described in detail in teletypesetter bulletins No. 1, dated 1939; No. 4, dated 1939; No. 6, dated January 1939; No. 7, dated January, 1938; No. 9, dated March, 1941; No. 53 dated January, 1941 and No. 52 dated November, 1936, all published by Teletype Corporation, 1400 Wrightwood Avenue, Chicago, Illinois, and in U.S. Patents 2,006,860, 2,057,652, 2,060,838 and 2,091,286. The Teletype Corporation's tape perforator device is disclosed in U.S. Patents 2,080,424, 2,080,426, 2,083,570, 2,083,608 and 2,113,890.

In the conventional operation of the apparatus referred to above a tape is perforated on the teletypesetter device by an operator using the keyboard of the perforator to transcribe the material to be printed. The keyboard of the perforator resembles a typewriter keyboard and to indicate the space between each word the operator strikes a spaceband bar which perforates the tape so as to call for release of a spaceband when the tape is later fed into the teletypesetter attachment on the Linotype machine. The perforator is provided with a scale and counting pointer, which, at the end of each line of type placed on the tape indicates whether or not the line can be properly justified in the Linotype machine. If, at the end of a line of type perforated on the tape, the counting pointer indicates that the line will not be properly justified, the operator must correct the line of type just perforated so as to call for spacebands of a type which will justify the line.

Linotype machines are conventionally provided with spacebands of at least three sizes, the standard size, relatively thin spacebands referred to as "thins," and somewhat wider spacebands referred to as "ens." When the counterpointer on the perforator device indicates that a line of type will not justify in the Linotype machine, by noting the indication on the scale, the perforator operator can determine whether proper line justification requires that a thin or en spaceband must be assembled with each standard spaceband in the Linotype machine. If the scale on the perforator indicates that an additional thin spaceband is required at each space between words in order to justify the line of type, the operator must roll back the tape to the start of the line and depress the thin spaceband key on the perforator at each point on the tape where a standard spaceband is called for. If it is determined that proper justification of the line requires an en spaceband with each standard spaceband, the operator must strike the rubout key and retype the line, striking the en spaceband key between each word. The standard code used in perforating the tape for use in teletypesetter attachments is such that when en spacebands are to be inserted, this rubout and reperforation procedure must be followed rather than the rollback procedure called for when thin spacebands are to be added.

These rollbacks and rubouts are time consuming and greatly reduce the tape lineage which can be completed in a given time by even an experienced operator. Because of the interruption in the operation of the perforator and the extra mental effort required to complete the rollbacks and rubouts, the operator may neglect to apply this corrective procedure to the tape when the counterpointer indication is equivocal, with the result that the line of type may not be properly justified within the Linotype machine when the line is to be cast, causing stoppage and delay of the Linotype machine and a break in the continuity of the printed material to be cast therein.

The apparatus of the present invention eliminates the necessity for time consuming rollbacks or rubouts to provide proper justification of a line of type. When the perforated tape is to be fed into the automatic operating attachment of a linecasting machine into which is incorporated the present invention, the perforator operator uses his return signal key to indicate which size of the spaceband should be inserted in the assembly of the line to properly justify it. For example, if after perforating a line of type the counting pointer and scale on the perforator indicates additional thin spacebands are required to justify the line of type, the operator strikes his return signal key twice. If the addition of en spacebands are indicated, the operator strikes the return signal key three times. If the line of type is indicated to be properly justified without the addition of either thin or en spacebands, the operator provides the tape with a conventional return signal by striking the return signal key but once. Tape punched for use with the apparatus of the present invention will thus have additional return signal perforations at the end of each line where thin or en spacebands are needed.

The apparatus of the present invention consists primarily of a tape reading head, a memory or information storage system referred to as a control unit, a sequence unit, and a switch mounted at the front end of the teletypesetter elevate shaft and closed momentarily with each elevate signal read by the teletypesetter. Further components include a spaceband switch mounted in front of that teletypesetter keyboard bell crank lever which releases standard spacebands, and two solenoid actuators located on the bar in back of the teletypesetter keyboard weights, the solenoids functioning to release either thin or en spacebands.

The tape reading head of the present invention reads the tape prior to its entry into the teletypesetter operating attachment and reads the tape at a rate which exceeds the rate at which the tape is read by the teletypesetter operating attachment. When a line of tape read by the apparatus of the present invention has only the regular return and elevate signal, a time delay cycle is initiated which stops the reading of tape by the apparatus of the present invention several signals after this return signal has been sensed. The apparatus of the present invention then waits until the teletypesetter operating attachment has finished the preceding line and elevates that line. As the teletypesetter elevates the line ahead, the elevator switch is closed, causing the apparatus of the present invention to start reading the next line. If it is assumed that the line now being read by the apparatus of the present invention has two return signals, the first return signal, as before, starts the aforementioned time delay cycle. The second return signal provides the memory circuit in the control unit component of the present invention with information indicating that thin spacebands are to be added to this line. When reading of the preceding line is completed by the teletypesetter operating attachment, the elevate signal sensed by the operating attachment closes the elevator switch momentarily. Closure of this switch causes the sequence unit component of the apparatus of the present invention to operate, utilizing the information stored in the control unit to set up an energizing circuit for a thin spaceband holding relay. Subsequently, as this line is assembled in the Linotype machine and the spaceband switch is closed, the proper solenoid actuator will cause thin spacebands to drop with each standard spaceband. Should there have been three return signals at the end of the line under consideration, the first return signal, as previously mentioned, would initiate the time delay cycle. The third return signal would have cancelled the second return signal and provided the memory circuit of the control unit with information indicating that en spacebands are to be dropped between each word in the line.

It is, therefore, an object of the present invention to provide an apparatus for use with perforated tape input, automatically operated slug linecasting machines, by means of which the tape perforator operator can apply a corrective signal to the tape to provide the required additional spacebands (either en or thin type) after the perforations for a line of type have been made, thereby eliminating the necessity for rollback or rubout operations on the tape.

A further object of the present invention is to provide an apparatus for reading the perforations making up each line of type in a continuously perforated tape, the tape being read by said apparatus one line ahead of its reading by the linecasting machine operating attachment, the apparatus thus being enabled to set up a corrective condition in the linecasting machine as the reading of the tape for said line of type begins at said operating attachment.

A further object of the present invention is to provide an apparatus of the type referred to above characterized by ease of adjustment and a minimum of maintenance.

A further object of the present invention is to provide an apparatus which can be conveniently installed in or removed from operating position with relation to the automatic operating attachment for a linecasting machine.

A further object of the present invention is to provide a perforated-tape reading head which sequentially advances the tape through the head and checks the tape for a predetermined pattern of perforations therein.

The full nature of the invention will be understood from the accompanying drawings and the following description and claims:

Fig. 1 is a perspective view showing a portion of a Linotype machine having a teletypesetter operating attachment in place thereon.

Fig. 2 is a perspective view of a teletypesetter tape perforator device.

Fig. 3 is an enlarged view of a section of perforated tape of the type used in the apparatus of the present invention.

Fig. 4 is a perspective view of the apparatus of the present invention shown in operative relation to the teletypesetter attachment.

Fig. 5 is a perspective, fragmentary view showing the location of certain components of the apparatus of the present invention mounted on the teletypesetter attachment.

Fig. 6 is a side view of the solenoid actuators which are components of the present invention.

Fig. 7 is a rear view of the solenoid assembly shown in Fig. 6.

Fig. 8 is an enlarged fragmentary view of a portion of the Linotype machine keyboard indicating the coaction of the solenoid actuators and the Linotype keyboard mechanism.

Fig. 9 is a perspective view showing the arrangement of certain of the components of the present invention.

Fig. 11 is a further perspective view of the tape reading head of the present invention.

Fig. 12 is a perspective view of the tape reading head taken from the side opposite that illustrated in Fig. 11.

Fig. 13 is an enlarged, fragmentary view of a component of the tape reading head with certain portions in section.

Fig. 16 is an end view of a further component of the tape reading head.

Figure 10:
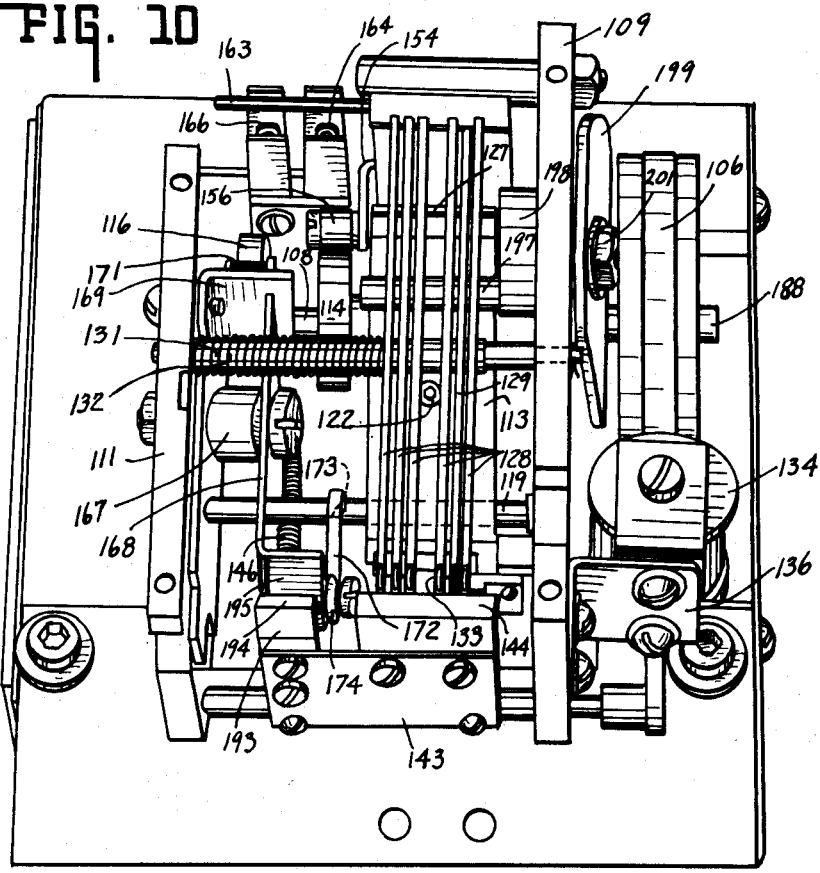
Fig. 10 is an enlarged perspective view of the tape reading head of the present invention.

Initially referring to Fig. 1, there is shown a conventional Linotype machine having attached thereto a teletypesetter operating unit indicated generally at 10. The Linotype machine includes a keyboard 11, an assembling elevator mechanism 12, and an assembler 13. The Linotype machine further includes an assembler belt 14 which transfers matrices or mats from the magazine 16 to the assembler. It will be understood by those familiar with the operation of Linotype machines that mats, as they are selected by the keyboard mechanism, drop from the magazine into the chutes to be transported by the assembler belt to the assemblying elevator. In the operation of the machine, the assembled line of type is moved to a casting position, the line slug is cast, and the mats are subsequently returned to the magazine.

The teletypesetter attachment is mounted on the Linotype machine and includes a tape feeding and selecting mechanism 17 adapted to read a perforated tape 18 fed thereto. The teletypesetter also includes a series of push bars and key lever bell cranks attached along the front margin of the keyboard 11, these components in Fig. 1 being enclosed by a cover plate 19. The teletypesetter unit is supplied power by means of a pulley 21 installed on the Lintotype machine and provided with a belt 22.

Referring now to Fig. 2, the perforator for preparing the tape is of conventional type and includes a keyboard 26, a scale 27 and a cooperating counting pointer 28. Justification pointers 29 are further provided, as is also a mounting board 31 for the printed material to be transferred to the perforated tape. It will be understood that the perforator operator strikes the keys so as to perforate a blank tape with a code which identifies the letters struck on the keyboard. The tape is thus given a coded series of perforations which correspond to the material to be printed. Between each words or wherever a space is desired, the spaceband bar on the perforator is struck placing a signal on the tape which calls for the release of a spaceband when the line of type is later assembled in the Linotype machine. At the end of the perforation of a line of type, the counting pointer 28 will have been incrementally moved to the area between the justification pointers 29. If it has not moved to this position at the end of a line of type, the operator will thereby be informed that the line just perforated will not properly justify in the Linotype machine. In conventional practice, in order to assure that the corrective en or thin spacebands are added to the line, he must carry out the rubout or rollback procedure.

It will be understood that the Linotype machine, the teletypesetter operating attachment, and the teletypesetter perforator just described are conventional devices and serve only as environment for the present invention.

The apparatus of the present invention is shown in Fig. 4 and includes tape holder 32 holding a roll of tape 18 which has been perforated in a perforator device as described with reference to Fig. 2. The tape is fed into a tape reading head 33 supported by means of a plate 34 upon a housing 36 which encloses various components of the apparatus of the present invention. It will be evident that the tape reading head 33 reads the tape ahead of the teletypesetter attachment with a loop of tape 37 being maintained therebetween as will subsequently be described. The wing nuts 38, accessible at the front face of the housing 36, serve to clamp the plate 34 in a suitable guide channel (not shown) which permits the tape reading head to be positioned at the required level with relation to the teletypesetter attachment.

Two of the remote components of the apparatus of the present invention are shown in Fig. 5 and include the normally open spaceband switch 39. This switch is formed by two parallel extending blades carrying contacts 41 adjacent their free ends and the blades are mounted by means of a bracket 42 upon a bar 43 forming a part of the bell crank lever assembly of the teletypesetter. A fibre abutment 44 carried by the free end of the inner switch blade is contacted by the spaceband bell crank lever each time it is actuated. The spaceband switch 39 is thus momentarily closed each time the spaceband bell crank lever is actuated, indicating that a standard spaceband is to be dropped into the line of type as called for by the perforated tape.

The other remote component of the apparatus of the present invention shown in Fig. 5 is the elevator switch 46. This elevator switch is of a conventional, enclosed, normally open type and has a thrust roller 47 which is actuated by a cam 48. The cam 48 is mounted on the front end of the elevator cam shaft 49 of the teletypesetter attachment. The cooperation of the cam and the thrust roller is such that each time the elevate signal is read from the tape by the teletypesetter and the line of type is consequently elevated, the elevator switch 46 will be momentarily closed.

Referring to Figs. 6 and 7, a further remote component of the apparatus of the present invention will now be described. A bracket 51 is adapted to be mounted at the back of the Linotype machine keyboard and on the keyboard cam frame supporting posts of the Linotype machine. The bracket carries an upwardly extending plate 52 which has an elongated rectangular slot 53 therein. Rearwardly extending, spaced ears 54 at the ends of the slot serve to support the shaft 56. Pivotally mounted on the shaft are lift bars 57 and 58, which, as may best be seen in Fig. 6, are notched at their outer ends so as to provide extending fingers 59. While only lift bar 57 is visible in Fig. 6, it will be understood that the lift bar 58 has a similar configuration and is provided with a similar extending finger. At a point 61, intermediate the length of the lift bar 59 there is pivotally attached the plunger 62 of a solenoid actuator 63. A similar solenoid actuator 64 (Fig. 7) is also provided for the lift bar 58. As will be apparent from Fig. 6, when the solenoid actuator 63 is energized, the finger 59 on the bar 57 will be raised, the bar pivoting about the shaft 56. Similarly when the solenoid actuator 64 is energized, the extending finger on the bar 58 will be raised.

When energized the solenoid actuators 63 and 64, through movement of the bars 57 and 58, function to drop thin or en spacebands into the line of type being assembled in the Linotype machine. The manner in which the lift bars 57 and 58 cooperate with the thin and en keyboard bar on the Linotype machine will now be described with reference to Fig. 8. The extending finger 59 on the lift bar 57 extends into a notched portion 66 on the thin spaceband keyboard bar 67. The keyboard bar receives within a further notched area 68 the extending end 69 of the thin spaceband key lever. The upper end of the bar 67 cooperates with the trigger 71, the keyboard cam yoke 72 and the keyboard cam 73. It will be understood by those familiar with the operation of the keyboard machanism of a Linotype machine that upward movement of the bar 67 caused by depression of the pivotally mounted key lever 69 results in dropping of a thin spaceband into the line of type being assembled, this operation being carried out through the coaction of the trigger 71, keyboard cam yoke 72, the keyboard cam 73 and the keyboard cam roll 74. It will be evident that upward movement of the extending finger 59 also moves the bar 67 upwardly, and this upward movement will similarly result in dropping of a thin spaceband keyboard bar 67 in the same fashion as the thin spaceband key lever 69. Although the release of thin spacebands by the bar 57 has been described with reference to Fig. 8, it will be understood that the bar 58 similarly actuates the en spaceband keyboard bar to cause release of an en spaceband into the line of type in the Linotype machine each time the solenoid 64 is energized.

Referring now to Fig. 9, there is shown the housing 36 having its back plate removed. The housing is provided with transverse partitions 76 which divide the housing into four sections. The upper right-hand section, as viewed in Fig. 9, houses a power pack which includes a transformer 77, a rectifier bank 78 and various fuses 79. The upper left-hand section of the housing has mounted therein the components of a time delay circuit which includes a transistor 81 and a time delay relay 82.

The lower left-hand section has mounted therein a control unit which includes a sequence or counting relay 83, a thin spaceband relay 84 and an en spaceband relay 86. The lower right-hand section houses the sequence unit which includes a panel 87 through which extends a shaft 88, carrying at its outer end a cam 89. Mounted on the panel and extending into cooperative relation with the cam is a normally closed switch 91 which is connected in the energizing circuit of a cam motor 92. The motor 92 is behind the panel 87 in Fig. 9 and is therefore not visible, but is shown in schematic form in Fig. 16. The panel 87 further supports a normally closed memory release switch 93 which also cooperates with the cam. A normally open, transfer switch 94 is further mounted on the panel and cooperates with the cam 88. A normally open, relay memory release switch 96 is also mounted on the panel and cooperates with the cam. A solenoid stop 95 is mounted on the upper margin of the panel and has extending therefrom a locking rod 97 which engages the shaft 88 and locks it against rotation after its driving motor 92 is de-energized.

From the foregoing it will be evident that the sequence unit includes four switches which are sequentially operated by the cam 89 as it rotates counterclockwise as viewed in Fig. 9. The locking solenoid 95 serves to prevent over-run of the cam when its driving motor is de-energized. It will be apparent that other means, such as substitution of a permanent magnet motor for the motor 92, might be utilized to provide a non-overrunning drive for the shaft 88.

Referring now to Figs. 10, 11, 12, 13, 14 and 15, the tape reading or selector head will now be described. The head includes a supporting housing 98 having open top and bottom areas, an inwardly extending tab 99 being formed at each of the lower corners of the housing. Matching openings in the tabs and in the sidewardly-extending portion 101 of the supporting plate 34 accommodate mounting screws 102. A washer carried at the end of each of the mounting screws serves to anchor compression springs 103. It will be understood that the spring loaded, tiltable mounting thereby provided for the housing 98, permits a limited amount of upward displacement of the housing with relation to the supporting plate 34 for a purpose to be subsequently described. Mounted within the housing is a drive motor 104, which, by means of a belt 106, rotates a driven pulley 107 and the shaft 108 to which it is attached. The shaft is journaled in supporting plates 109 and 111 and extends thereacross.

Referring to Fig. 10, the shaft 108 carries a selector lever operating cam 112, the cam being hidden by the selector lever actuator 113 in Fig. 10 but shown in Fig. 13. The shaft 108 has further mounted thereon a transfer lever cam 114 and adjacent this cam further mounts the tape advancing cam 116.

The cam 112 (Fig. 13) cooperates with a roller 117 carried on the free end of a lever 118. The lever 118 is pivotally supported on the shaft 119 which extends between the plates 109 and 111. The lever 118 fits within the channel-shaped lever 121 which is also pivotally supported on the shaft 119. An adjusting screw 122 extends through a slot 123 in the upper face of the lever 121 and has threaded engagement with a depending stud 124 carried by the lever 118. A setscrew 126 extends through the stud transversely to the screw 122 and provides a means for locking the adjusted position of the screw 122. A compression spring 125 encircles the screw 122 and serves, together with the stud 124, to fix the positional relation of the levers 118 and 121 which make up the selector lever actuator assembly 113.

The free end of the lever 121 has extending upwardly therefrom a thrust member 127 which cooperates with a series of selector levers 128. All of the selector levers have an identical configuration, as shown in Fig. 13, except for lever 129 which, as may be seen in Fig. 14, has a differing configuration at one of its ends, as will subsequently be described. The selector levers are appropriately journaled and spaced upon a shaft 131 which extends across the plates 109 and 111, and an adjustable compression spring 132 determines the freedom with which the selector levers may pivot on the shaft.

At one of its ends each of the selector levers carries a tape reading pin 133 which, in the assembled apparatus are adapted to extend upwardly through the aligned perforations in the tape 18 illustrated in Fig. 3. A tape control solenoid 134 is mounted by means of a suitable bracket 136 on the plate 109 and has pivotally connected to the lower end of its plunger 137 a crank arm 138. The crank arm has rigidly mounted thereon a sleeve 139 which, by means of a setscrew 141, is locked to a shaft 142 journaled in the plates 109 and 111. The central portion of the shaft 142 has rigidly secured thereto a tape feed control lever 143. Extending from the control lever is a selector lever latch 144 having an inwardly extending marginal flange. A tension spring 146 (Fig. 10), extending between the control lever and an appropriate tab protruding from the plate 111 serves to urge the control lever into a position such that the selector lever latch 144 overlies the extreme ends 147 (Fig. 14) of the selector levers.

Figure 14:
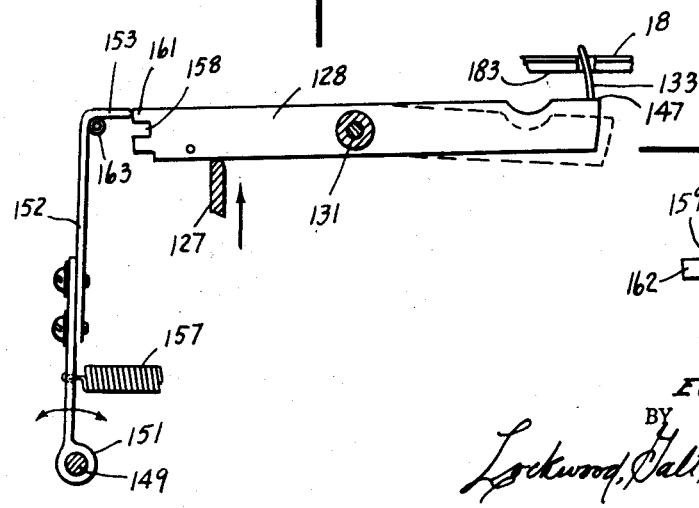
Fig. 14 is an enlarged, fragmentary view of a further component of the tape reading head.
Figure 15:
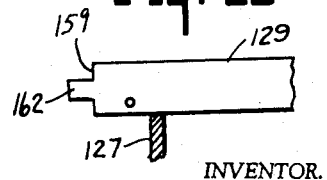
Fig. 15 is an enlarged, fragmentary view of a further component of the tape reading head.

As will be apparent from Figs. 11 and 13, when the solenoid 134 is de-energized the selector lever latch 144 will hold the selector levers in their broken line position of Fig. 14, that is, with their ends carrying the pins 133 positioned downwardly so that the pins clear the tape 18. When the solenoid is energized, the shaft 142 will be rotated through a small angle counter-clockwise, as viewed in Fig. 11, removing the latch 144 from the ends 147 of the selector levers.

From a consideration of Fig. 13 with relation to Fig. 14, it will also be apparent that, as the cam 112 rotates, the lever assembly 113, and the member 127, will be reciprocated upwardly and downwardly to pivot the selector levers in unison about the shaft 131. This pivotal reciprocating movement of the selector levers can only take place when the solenoid 134 is energized and the latch 144 is out of contact with the ends of the selector levers. When the solenoid 134 is de-energized the latch 144 prevents pivotal movement of the selector levers, with the motion of the cam 112 being taken up by the spring 125.

The tape reading head is adapted to respond or sense the presence of one or more sequential perforations 148 (Fig. 3) in the return signal area of the tape 18. The means whereby this function is accomplished will now be described with particular reference to Figs. 12, 13 and 14. As may be seen in Fig. 12, a shaft 149 extends between the plates 109 and 111, and its central portion has rotatably mounted thereon a sleeve 151. Extending from the sleeve is a bifurcated transfer lever 152 which at its upward end carries a key 153 which extends inwardly towards the ends of the selector levers.

As may be seen in Fig. 10, the transfer lever has a rearwardly-extending arm 154 which carries a roller 156 thereon cooperating with the cam 114. It will thus be apparent that as the cam 114 is rotated the transfer lever will be angularly reciprocated toward and away from the notched ends of the selector levers. A tension spring 157 (Fig. 14) serves to hold the roller 156 against the cam 114.

The key 153 cooperates with the ends of the selector levers, each of the levers 128 being provided with a notch 158. As may be seen in Fig. 15, the selector lever 129 is also provided with a notch 159, which, however, is not horizontally aligned with the notches 158. As the cam 112 rotates, the notched ends of the selector levers will be reciprocated across the face of the key 153 and, in synchronism with this movement, the cam 114 will periodically urge the key toward the notched lever ends. If the perforations in the tape passing by the pins 133 allows all the pins to assume an upward position, the portions 161 of the levers 128 will prevent the key from entering the notches. If the perforations in the tape are such as to prevent any of the pins 133 from extending therethrough, the selector levers will all be maintained in their broken line, or outward position of Fig. 13, wherein the extending portion 162 of the lever 129 will prevent the key from entering the slots. However, if only a return signal, as indicated at 148 in Fig. 3, is carried by the tape, only the lever 129 will be permitted to assume its upward position with the levers 128 being retained in their lower position. Under these conditions the slot 159 will be aligned with the slots 158 and the key 153 will be permitted entry therein. It may thus be seen that as the tape 18 passes over the pins 133, the transfer lever 152 will be permitted to complete its movement only if a return signal, indicated at 148 in Fig. 3, is carried by the tape.

The transfer lever has extending sidewardly therefrom a member 163 which cooperates with the ends of two blades forming a part of the normally closed transfer switches 164 and 166, the switch blades being mounted on a bracket 167 carried by the plate 111. The switch blades are biased so as to maintain the switches 164 and 166 closed, the switches being held open by the member 163 as long as the key 153 is not within the notches 158 and 159. When the tape carries a return signal, as previously pointed out, the key 153 momentarily enters the notches and thereby momentarily closes the switches 164 and 166.

Referring now to Figs. 10 and 16, the means for advancing the tape across the pins 133 will now be described. A stub shaft 167 (Fig. 10) extends from the inner face of the plate 111 and serves to pivotally mount a tape feed lever 168 which extends freely through a slotted guide bracket 169 and on its end carries a roller 171 which cooperates with the cam 116. The opposite end of the lever 168 is bent inwardly and pivotally supports a tape feed pawl 172. The pawl is provided with a hooked end 173 and is spring biased by a coiled spring 174 in a clockwise direction, viewing the pawl 172 from the right in Fig. 10. The hooked end of the pawl cooperates with a ratchet 176 shown in Fig. 16. The ratchet is keyed to a shaft 177 journaled in blocks 178 rigidly mounted on the under surface of a plate 179 which is adapted to be supported on the upper margins of the side plates 109 and 111. The shaft 177 has further keyed thereto a sprocket 181 having teeth 181a extending therefrom. The teeth extend through an appropriate slot 184 in a channel-shaped tape guide 183. An elongated slot 184 in the tape guide 183 permits the pins 133 on the selector levers to extend through the perforations in the tape. The teeth 181a carried by the sprocket are adapted to extend through the perforations 186 formed centrally on the tape 18, as may be seen in Fig. 3.

With the plate 179 mounted in place over the selector levers, perforated tape may be fed along the tape guide 183 with the teeth 181a extending through the central perforations 186 (Fig. 3) in the tape. As the cam 116 is rotated the tape feed lever 168 and the pawl 172 will be angularly reciprocated. The engagement of the hooked end 173 of the pawl with the teeth of the ratchet 176 will cause the sprocket 181 to be rotated incrementally with each downward movement of the pawl 172. The perforated tape will thus be advanced through the reading head as the sprocket 181 is rotated. An arm 187 depending from the under face of the plate 179 has extending therefrom a compression spring 188 which urges outwardly one arm 189 of a pivotally mounted bell crank. The other arm 191 of the bell crank supports a roller 192 which bears against the teeth of the ratchet 176 and serves to hold the ratchet in place as the pawl 172 moved through its upward stroke.

The advancement of tape through the tape reading head is controlled by means of a tape feed latch 193 carried by the tape feed control lever 143. This latch is provided with an inwardly extending upper margin 194 which cooperates with a block 195 carried at one end of the tape feed lever 168 and supporting the pawl 172. It will thus be evident that the tape moving motion of the lever 168 can only occur when the solenoid 134 is energized to free the lever 168 for upward movement. It may thus be seen that even though the various cams mounted on the shaft 108 are rotated by the drive motor, the tape advancing and tape reading function of the head can only be performed when the solenoid 134 is energized.

The tape reading head is constructed so that various critical adjustments may be conveniently made. For example, the limits of the downward motion of the pin ends of the selector levers may be adjusted by loosening the screw 126 (Fig. 13) and turning the screw 122 further into or out of the stud 124. The setscrew 126 may then be re-tightened to clamp the adjustment against vibration. It will be evident that rotation of screw 122 serves to change the relative positional relation of levers 118 and 121, thereby varying the downward limit of motion of the pin ends of the selector levers. As may be seen in Fig. 12a, an aperture 196 is provided in the plate 111 to permit convenient access to the setscrew 126. The plate 179 is provided with a similar aperture (not shown), permitting access to the adjusting screw 122.

Referring to Fig. 10, the limits of the upward motion of the pin ends of the selector levers is determined by an abutment 197 mounted eccentrically upon a disc 198. The disc has extending therefrom a shaft which protrudes through a suitable opening in the plate 109 and carries rigidly mounted thereon an adjusting lever 199. A nut 201 threaded upon the end of the shaft serves to clamp the assembly upon the plate 109. To adjust the position of abutment 197 upwardly or downwardly, thereby establishing the upper limit of movement with the pin ends of the selector levers, the nut 201 may be loosened, and by means of the lever 199, the position of the disc and consequently abutment 197 may be shifted.

As may be seen in Fig. 11, the housing 98 has extending from one side thereof a plate 202 which has depending therefrom a pair of spaced pins 203. These pins are adapted to extend freely through matching spaced openings in a tongue 204 extending from the side of the Linotype attachment, as may be seen in Fig. 4. The pins thus serve as a means for mounting the head in proper relation with the Linotype attachement. The spring mounting provided by mounting screw 102 and spring 103 (Fig. 11), permit the head to be conveniently raised upwardly and tilted with relation to the Linotype attachment to permit convenient installation and removal of the pins 203 with relation to the tongue 204 carried by the Linotype machine.

Figure 17:
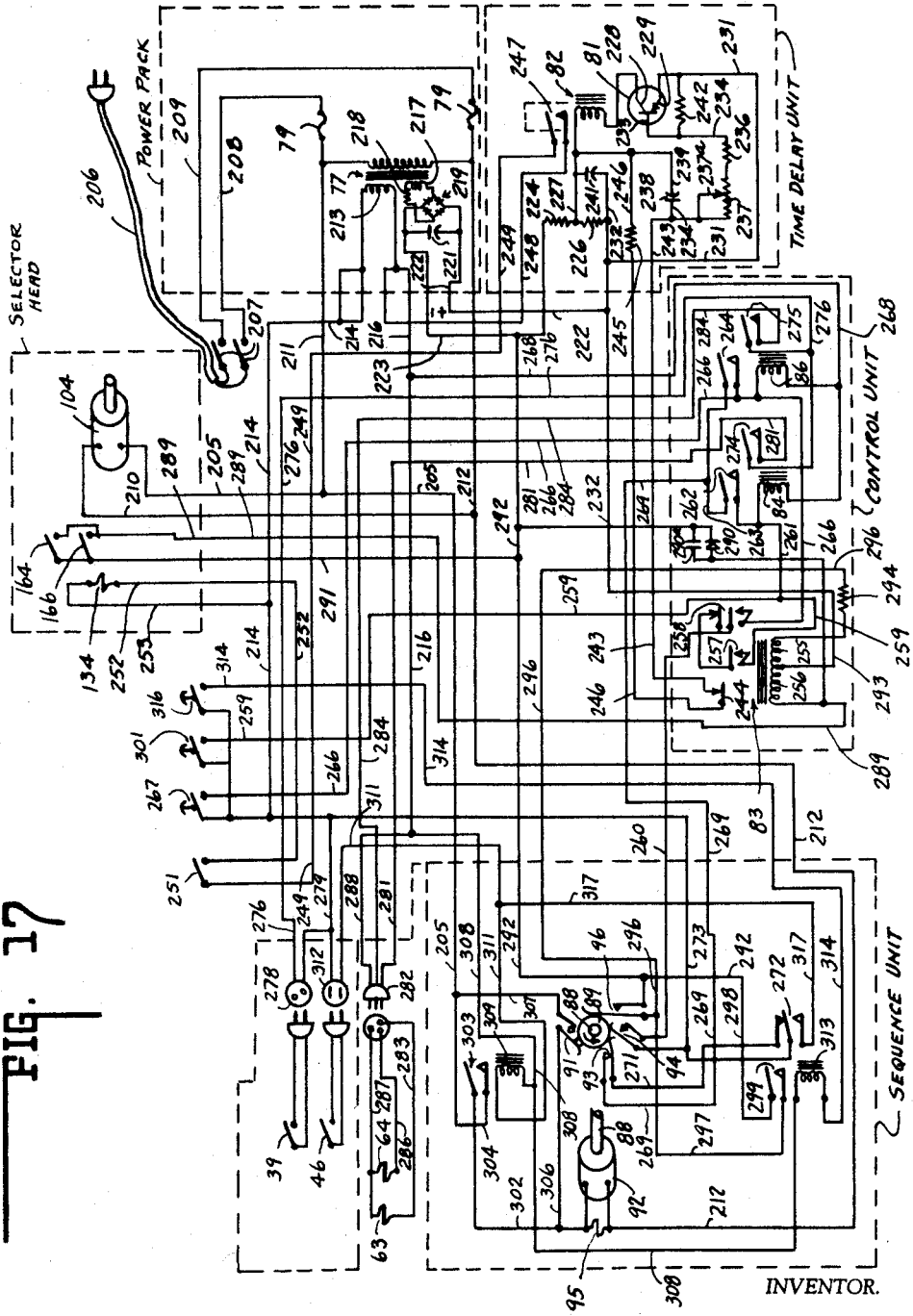
Fig. 17 is a schematic wiring diagram of the apparatus of the present invention.

The schematic wiring diagram illustrating the connections between the components just described is shown in Fig. 17, wherein various sub-combinations are enclosed in broken lines to more clearly set off the particular operation and fuction of these sub-combinations.

Referring now to Fig. 17, a plug and leadin wire 206, adapted to be connected to a 115 volt 60 cycle source of power, is connected to a double pole motor switch 207, having a toggle operator 207a visible in Fig. 9. The switch 207 is connected by wires 208 and 209, through suitable fuses 79, to the primary of the power transformer 77 forming a part of the power pack. An extension 211 of the wire 208 and an extension 212 of the wire 209 provide 115 volt A.C. bus wires. Wires 205 and 210 connect the tape drive motor 104 between the wires 211 and 212, the motor being thereby energized whenever the switch 207 is closed. The secondary coil 213 of the transformer provides 6 volt A.C. bus wires 214 and 216. The transformer secondary 217 is connected through a resistor 218 across a rectifying bridge 219.

The output of the bridge has connected thereacross a smoothing condenser 221 and is further connected to the wires 222 and 223, with wire 223 having a negative polarity and wire 222 positive polarity. A voltage divider comprising resistances 224 and 226 are connected across the wires 222 and 223. Connected to the junction of these two resistances is a wire 227 which is connected to one side of a time delay relay coil 82. The other side of the relay coil is connected to the collector 228 of the transistor 81. The emitter 229 of the transistor is connected by means of wire 231 to a wire 232, which in turn is connected to the positive side of the D.C. supply voltage provided by wires 222 and 223. The base 233 of the transistor is connected to wire 234 which has serially interposed therein a resistor 236 and a variable resistor or potentiometer. Wire 234 is further connected to one side of a timing condenser 238 whose other side is connected by means of wire 239 to the wire 227. The wire 232 serves to connect in parallel the resistance 226 and the filter condenser 241. A current limiting resistor 242 is connected between the base and the emitter of the transistor.

A wire 243 is connected to one side of the timing condenser 238 and to the normally closed contacts 244 of the sequencing relay 83, whose function will be subsequently described. The relay contacts 244 are connected by means of a wire 246 and a resistor 245 to the other side of the timing condenser 238, the switch 244 thus providing a shunt circuit for the condenser.

The normally open contacts 247 operated by the time delay relay 82 are connected by means of wire 248 to one side of the 6 volt A.C. source provided by wires 216 and 214. The other side of the switch 247 is connected by means of a wire 249 to one side of a tape-stop toggle switch 251, the manual operator for this switch being shown at 251a in Fig. 9. The other side of switch 251 is connected by means of a wire 252 to the tape control solenoid 134. The other side of the solenoid 134 is connected by means of a wire 253 to the wire 214. It may thus be seen that the relay switch 247 and the toggle switch 251, connected in series therewith, control the operation of the tape control solenoid 134.

With the switch 207 closed a portion of the D.C. voltage available at wires 222 and 223 will be impressed across the resistor 226. Current flow through wire 231, resistance 242, wire 234, wire 243, switch 244 and wire 246 causes transistor base 233 to assume a negative potential with respect to the emitter 229. Since the transistor 81 is of the PNP type, with its base 233 negative, current will be conducted across the emitter and collector serving to energize the relay 82. Under these conditions the timing condenser 238 will be fully charged. With relay 82 energized the switch 247 will be closed, energizing the tape control solenoid 134, thereby causing the tape to be moved across the selector levers and permitting these levers to be moved by the lever assembly 113 as previously described. The transistor 81 will now continue to conduct, maintaining the tape reading function of the head until the lapse of a time period subsequent to the opening of the switch 244. This delayed deenergization of the relay 82 occurs upon the opening of the switch 244 which is accomplished in a sequence to be subsequently explained. Assuming the switch 244 is opened, however, the circuit around the timing condenser 238 will be broken, cutting off the current path to the transistor base 233, and thereby causing the transistor to become non-conductive. Relay coil 82 will thereupon be de-energized. The cutoff of transistor 81 will be delayed slightly, however, by the discharge of the condenser 238 which begins immediately upon the opening of the switch 244. The discharge time of condenser 238 thus measures a time delay interval which separates opening of switch 244 and the de-energization of relay 82. The wiper arm 237a of the potentiometer 237 may be adjusted so as to vary, within limits, the magnitude of this time delay period. An adjusting screw 237b is shown in Fig. 9, and it will be understood that adjustment of this screw serves to adjust the position of the wiper arm 237a of the potentiometer 237.

The operation of the control unit will now be described with particular attention to the operation and function of the sequence relay 83. The control unit includes the sequencing relay 83 which is of a conventional type having a pulse coil 256 and a release coil 255. The relay is characterized by the sequential operation of its switch 244 (the connections and functions of which have previously been described), switch 257 and double throw switch 258 in response to the application of one, two or three input pulses to the coil 256. Thus, a first input pulse to the coil 256 opens the contacts 244, a second input pulse closes the switch 257, and a third input pulse reverses the position of the double throw switch 258. The switches remain in the position to which they have been moved by the pulse coil until the release coil 255 is momentarily energized, whereupon the switches return to their normal positions. As previously mentioned, sequential relays of this type are conventional in the art, one such being manufactured under the trade name "Magnetic Impulse Counter" by Kellogg Switchboard and Supply Company, of Chicago, Illinois.

The switch 257 is connected at one of its terminals by wires 259 and 261 to one side of a switch 262, controlled by the thin relay coil 84. The other side of switch 257 is connected through the normally closed side of switch 258 to a wire 260 which is connected to the switch 94 in the sequence unit. The switch 262 is further connected by means of a wire 263 to one side of a switch 264 operated by the en relay coil 86. The other side of the switch 264 is connected to a wire 266 which is connected at one end to the normally open side of the double pole switch 258 operated by the relay coil 256, and to the end relay coil 86. At its other end the wire 266 is connected to one side of an en push button switch 267, the push button operator 267a for this switch being visible in Fig. 9. The corresponding ends of the thin relay coil 84 and the en relay coil 86 are both connected by means of a common wire 268 to one side of the A.C. power supply provided at wire 216. A wire 269 connects wire 263 to one side of the normally closed memory release switch 93 in the sequence unit. The other side of the switch 93 is connected by means of a wire 271 to the normally closed side of a relay operated switch 272, the switch 272 and its operating relay coil being also located in the sequence unit, as indicated in Fig. 16. The common side of the double throw switch 272 is connected by means of a wire 273 to one side of the A.C. power supply supplied by wire 214. The thin and en relay coils 84 and 86 also respectively operate the normally open relay switches 274 and 275.

Switches 274 and 275 have a common side which is connected by means of wire 276 to one terminal of a separable plug indicated at 278. The plug provides a means for connecting the remote spaceband switch 39 to the wire 276, the second terminal on the plug connecting the other side of the spaceband switch through the wire 279 to the A.C. supply wire 214. The other side of the switch 274 is connected by a wire 281 to one of the three terminals of a separable plug connector 282. The terminal carrying wire 281 is connected by means of the plug to a wire 283, which in turn is connected to one side of the thin spaceband release solenoid 63. A wire 284 similarly connects one side of the switch 275 to a further terminal in a separable plug 282. The plug serves to connect the wire 284 with a wire 286 which in turn is connected to one side of the remotely mounted en spaceband release solenoid 64. The common side of the solenoid coils 63 and 64 are connected by means of a wire 287 to a third terminal in the plug 282, this terminal being connected by means of wire 288 to one side of the A.C. power via wire 216.

One side of the pulse coil 256 of the relay 83 is connected by means of wire 289, to parallel connected transfer switches 164 and 166 in the tape reading head, and via wire 291 to the D.C. power supply wire 292, the wire 292 being connected to one side of the output of the rectifier network 219 by means of wire 223. Transfer switches 164 and 166 have connected thereacross a conventional spark suppressing network including rectifier 290 and condenser 290a.

The common side of the pulse coil 256 and the release coil 257 is connected by means of a wire 293 to the one side of the D.C. supply voltage, available at wire 232. The remote side of the release coil 257 is connected through a resistor 294 and by means of wire 296 to one side of the normally open sequence relay release switch 96. The other side of switch 96 is connected with the D.C. power supply wire 292. Wires 297 and 298 serve to connect the normally open, relay operated switch 299, in the sequence unit, in parallel with the switch 96, the mode of operation and function of switches 299 and 272 being subsequently described when the sequence unit is taken up in detail.

The wire 259 extends beyond its junction with wire 261 and is connected to one side of a push button operated thin relay release switch 301, the operator for the switch being indicated at 301a in Fig. 9. The other side of the push button switch 301 is connected to the A.C. power supply wire 214.

From the foregoing it will be apparent that the parallel connected transfer switches 164 and 166, which are closed each time a return signal appears on the tape progressing through the rotating head, provide a series of pulses to the sequencing relay coil 256. The relay coil 256 thus functions to operate switch 244, switch 257 and switch 258, depending upon whether it has received one, two or three pulses. If the tape, for example, carries two return signals at the end of the line just read by the tape reading head, switch 244 will be opened and switch 257 will be closed by the relay coil 256. As previously pointed out closure of switch 244 initiates a time delay period measured by the discharge time of condenser 238, at the end of which time delay the time delay relay operated switch 247 will be opened. Opening of switch 247 de-energizes the tape control solenoid, stopping the tape reading operation of the head. This time delay is normally of a duration such as to permit the reading of approximately nine spaces beyond the first return signal appearing on the tape. The second return signal appearing on the tape causes the relay 256 to close switch 257. Closure of switch 257 sets up an energization circuit for the thin relay coil 84, this circuit, however, not being completed because of the presence therein of the normally open sequence unit switch 94.

Similarly if the tape carries a series of three return signals at the end of a line, switch 258 will be reversed in position on the third return signal, thereby breaking the circuit through switch 257 and setting up an energizing circuit for the en relay coil 86, this circuit, however, being incomplete because of the presence therein of the normally open sequence switch 94. It will be noted that whether the tape carries one, two or three return signals, the first return signal always initiates the delayed shutdown of the tape reading function of the tape reading head.

The means for completing the energizing circuits for the thin and en relay coils 84 and 86 will become apparent as the description of the sequence unit is completed. The sequence unit has been previously referred to with reference to Fig. 9. Referring now to Fig. 16, it may be seen that the motor 92, driving shaft 88 and consequently cam 89, is connected in parallel to the solenoid stop coil 95. One side of the motor and stop coil are connected by means of a wire 302 to one side of a normally open cam control relay operated switch 303. The other side of the switch 303 is connected by a wire 304 to the wire 205, which in turn is connected to the 115 volt A.C. supply wire 211. A holding circuit, shunting the switch 303 is provided by means of the wires 306 and 307 with the cam operated switch 91 interposed therein. The other side of the solenoid stop coil 95 and the motor 92 is connected to the wire 212 which, in turn, is connected to the other side of the 115 volt A.C. source of power.

A wire 308 connects one side of a cam control relay coil 309 to the low voltage AC power supply wire 260. The other side of the relay coil 309 is connected by means of a wire 311 to one terminal of the separable plug 312. The plug 312 serves to connect wire 311 to one side of the remote elevator switch 46. The other side of the elevator switch is connected through the plug 312 to the wire 279 which, via wire 273, connects with the low voltage AC power supply wire 214.

The wire 308 extends beyond its junction with the relay coil 309 and is connected to a release relay coil 313. The other side of the relay coil 313 is connected by means of a wire 314 to one side of a push button operated release switch 316. The push button operator for the switch 316 is indicated at 316a in Fig. 9. The other side of the release switch is connected in common with the switches 267 and 301 to the power supply wire 214. One side of the switch 272, operated by the release relay 313 is connected by means of a wire 317 to the wire 311.

The operation of the sequencing unit is initiated by closure of the elevator switch 46, thereby energizing relay coil 309. The consequent closure of contacts 303 starts rotation of the motor 92 and energizes the solenoid stop 95 to permit such rotation. The initial increment of rotation of the cam 89 serves to close switch 91, thereby maintaining the motor 92 energized independently of switch 303. Continued counterclockwise rotation of cam 89 opens the switch 93, which breaks the holding circuit for the relay coils 84 and 86 in the control unit, thereby de-energizing whichever one of these relays had been held in from the previous cycle. Continued rotation of cam 89 closes the switch 94. Closure of this switch completes the energizing circuit to either the thin relay coil 84 or the en relay coil 86, depending on which of the two has had its energizing circuit set up by switches 257 and 258. The switch 94 may thus be said to operate, when closed, to transfer the count held in the sequence relay 83 into the "memory" provided by energization of either relay coil 84 or 86. Continued rotation of cam 89 momentarily closes switch 96 which energizes the release coil 255 of the sequence relay 83, thereby moving all of the switches 244, 257 and 258 to their de-energized positions. The resistor 294 in the energizing circuit for the release coil 255 functions to prevent complete loss of residual magnetism in the sequence relay 83, its use being conventional with such relays. As the cam 89 completes 360° of rotation, the switch 91 will again be opened, thereby de-energizing the motor 92 and the solenoid stop 95 and completing the cycle of the sequence unit.

A table of preferred values and identification numbers for the various components of the circuit shown in Fig. 17 are set out below.

| Component: | Value |
| --- | --- |
| 218 | 5 ohms. |
| 221 | 40 microfarads. |
| 224 | 750 ohms. |
| 226 | 350 ohms. |
| 241 | 40 microfarads. |
| 245 | 27 ohms. |
| 238 | Approximately 5 microfarads. |
| 242 | 2700 ohms. |
| 237 | 100 kilohms. |
| 236 | 15 kilohms. |
| 290a | .5 microfarads. |
| 290 | 35 milliamps. |
| 294 | 700 ohms. |

| Transistor: | Number |
| --- | --- |
| 81 | 2N188A or 2N320 |

As previously pointed out, when the tape perforator operator perforates tape which is to be used with the apparatus of the present invention, he merely needs to make one, two or three return signal perforations in the tape to indicate that the line just punched will require no additional spacebands, an additional thin spaceband at each space, or an additional en spaceband at each space. In considering the operation of the apparatus of the present invention, it should be kept in mind that this apparatus reads the tape at a much faster speed than does the teletypesetter operating attachment, the speed of operation of the apparatus of the present invention being of the order of 960 perforations per minute. The operation of the complete apparatus of the present invention can be readily explained if it is assumed that both the teletypesetter operator aatchment and the apparatus of the present invention are, at the beginning of the period under consideration, each midway in the reading of a perforated line of type, with the apparatus of the present invention reading one line ahead of the teletypesetter attachment. As the tape reading head of the present invention senses the first return signal at the end of the line which it is reading, switch 244 is closed, initiating the time delay at the end of which the head will stop reading the tape, this delay being sufficient to permit reading of approximately nine perforations beyond the first return signal. If we assume that the line just read by the tape reading head requires a thin spaceband at each space between words, there will be one return signal in addition to the initial one. This second return signal will close the switch 257, setting up the energizing circuit for the thin relay 84. The tape reading head now continues reading a few perforations further and is then shut down by the time delay unit. It will thus be apparent that the control unit of the present invention has stored in the sequence relay information regarding the number of additional spacebands which must be dropped in the line just read.

Although the tape has ceased to be advanced through the tape reading head of the present invention, the teletypesetter attachment continues to read tape. As the teletypesetter attachment provides an elevate signal to the Linotype machine, indicating that the line is complete, the elevator switch 46 of the present invention will be closed for a short interval. Closure of switch 46 energizes relay 309 in the sequence unit of the present invention, and the consequent closure of switch 303 energizes the motor 92 to initiate the rotation of cam 89. Rotation of cam 89 continues because of the closure of switch 91, and in rapid succession the cam functions to (1) open the switch 93 serving to break the holding circuits for relays 84 and 86 established as the preceding line of type was read; (2) close switch 94, thereby energizing thin relay coil 84, switch 94 thus functioning to transfer the information stored in the sequence relay to the "memory" provided by energization of relay 84; (3) close switch 96 to energize the release coil 255 in the sequence relay 83, thereby setting up the sequence relay for receipt of information regarding the next line of type to be read by the tape reading head; and (4) finally reopen switch 91, shutting down the motor 92 and completing the cycle of the sequence unit.

At the end of this sequence of operation of the apparatus of the present invention, the thin relay 84 will be energized and the circuit will be set up for energizing the thin spaceband release solenoid 63 each time the spaceband switch 39 is closed. Thus, as the teletypesetter provides the elevate signal, indicating the end of a line, the sequence unit of the present invention will operate to set up circuits which will provide energization of the thin spaceband release solenoid 63 each time the teletypesetter reaches a space signal in the subsequent line.

It was initially assumed that the line of type under consideration required thin spacebands and thus had two return signals in the tape. If the line had required en spacebands, there would have been three return signals in the tape. Operation of the apparatus of the present invention would under these conditions be identical to that just described, with the exception that the en relay 86 would have been energized and the en spaceband release solenoid 64 would have been set up for operation upon closure of elevator switch 46.

If the line of type under consideration had required neither thin nor en spacebands, only one return signal would have appeared on the tape. Under these conditions operation of the apparatus of the present invention would have been identical to that described above except that neither thin relay 84 or en relay 86 would have been energized as the sequencing unit moved through its cycle.

The function of the push button release switches 267, 301 and 316 will now be described. It is sometimes necessary to resynchronize the apparatus of the present invention with the teletypesetter operating unit. This necessity occurs when a line of type must be backed up in the teletypesetter attachment in order to pick up a lost line or when a line has been pied through the machine due to an "assembler jam." This re-synchronizing procedure may be carried out by backing up the tape to the starting position described on the teletypesetter operating unit.

The toggle switch 251 is then opened and the push button 316 is depressed. Opening switch 251 prevents tape reading operation of the head. Closure of switch 316 energizes release relay coil 313. Energization of relay coil 313 opens the normally closed contacts of switch 272, thereby breaking the holding circuits which may have been previously established for either the thin relay coil 84 or the en relay coil 86. Energization of relay coil 313 also closes the normally open contacts of switch 272, thereby energizing relay coil 309 to start a cycle of the sequence unit cam 89. As cam 89 moves through its cycle, closure of switch 96 energizes release coil 255 to clear the sequence relay. The tape is then placed on the reading head of the apparatus of the present invention with the elevate signal which is at the end of the line started on the teletypesetter operating unit between the selector pins of the operating unit and the selector pins 133 of the tape reading head. The number of return signals at the end of the line just starting on the teletypesetter operating attachment must then be read. If only one return signal appears at the end of this line, the tape control switch 251 may be re-closed and the tape reading head re-started. If there are two return signals at the end of this line being restarted, the switch 301 is momentarily closed and thereafter the toggle switch 251 is closed. Closure of switch 301 serves to set in an artificial "memory" in the control unit by energizing the thin relay 84 independently of the sequence unit. If there are three return signals at the end of the line being re-started, the push button switch 267 is momentarily closed, thereby energizing en relay 86 independently of the sequencing relay 83.

It may thus be seen that by disposing the apparatus of the present invention so as to read the tape one line ahead of the teletypesetter operating attachment, corrective signals applied to the tape at the end of a line are utilized to set corrective conditions into the Linotype machine which anticipate the subsequent reading of the line of type by its teletypesetter attachment. The means for accomplishing this function, including particularly the circuit arrangement of Fig. 17 and the structure of the tape reading head are the subject of the subsequently appended claims.

The invention claimed is:

1. An apparatus for automatically inserting additional spacebands of a selected size in a line of type assembled in a slug linecasting machine to assure proper justification of the line, said linecasting machine being controlled by an automatic operating attachment having a perforated tape signal input, said apparatus including electrically energized actuators cooperating with said linecasting machine for releasing spacebands of the selected size into the line assembly, a signal sensing head adapted to read said tape in advance of and at a speed exceeding the tape reading speed of said automatic operating attachment, said head being adapted to detect a signal in the form of a series of perforations in said tape indicating the termination of a line of type and the size of the additional spacebands to be inserted therein, a time delay circuit adapted to halt the tape reading function of said head a predetermined time after actuation of said delay circuit, a control unit adapted to actuate said delay circuit on the sensing of the first perforation in said series by said head and for retaining in a memory circuit the number of further perforations in said series, said control unit including spaceband relays having holding circuits and selectively energizable to set up energizing circuits for one or the other of said electrically energized actuators, a sequencing unit including a series of switches sequentially operated in an operating cycle of said unit, means for initiating said operating cycle on response to completion of the assembly of a line of type in said linecasting machine, operation of said sequencing unit switches serving to sequentially: break the holding circuits of said spaceband relays, energize a selected one of said relays determined by the information retained in said memory circuit, clear said memory circuit of previously acquired information, and re-start the tape reading function of said head; and switch means operated with each spaceband signal read by said automatic operating attachment to complete the energizing circuit for the one of said actuators set up by the energized one of said spaceband relays, whereby said apparatus functions to insert additional spacebands in a line of type assembled in said linecasting machine with each spaceband signal read by said operating attachment.

2. An apparatus for automatically inserting additional spacebands of a selected size in a line of type assembled in a slug linecasting machine to assure proper justification of the line, said linecasting machine being controlled by an automatic operating attachment having a coded tape signal input, said apparatus including electrically energized actuators cooperating with said linecasting machine for releasing spacebands of the selected size into the line assembly, a signal sensing head adapted to read said tape in advance of and at a speed exceeding the tape reading speed of said automatic operating attachment, said head being adapted to detect a series of signals on said tape indicating the termination of a line of type and the size of the additional spacebands to be inserted therein, a time delay circuit adapted to halt the tape reading function of said head a predetermined time after actuation of said delay circuit, a control unit adapted to actuate said delay circuit on the sensing of the first signal in said series by said head and for retaining in a memory circuit the number of further signals in said series, said control unit including spaceband relays having holding circuits and selectively energizable to set up energizing circuits for one or the other of said electrically energized actuators, a sequencing unit including a series of switches sequentially operated in an operating cycle of said unit, means for initiating said operating cycle in response to completion of the assembly of a line of type in said linecasting machine, operation of said sequencing unit switches serving to sequentially: break the holding circuits of said spaceband relays, energize a selected one of said relays determined by the information retained in said memory circuit, clear said memory circuit of previously acquired information, and re-start the tape reading function of said head; and switch means operated with each spaceband signal read by said automatic operating attachment to complete the energizing circuit for the one of said actuators set up by the energized one of said spaceband relays, whereby said apparatus functions to insert additional spacebands in a line of type assembled in said linecasting machine with each spaceband read by said operating attachment.

3. An apparatus for automatically inserting additional spacebands of a selected size in a line of type assembled in a slug linecasting machine to assure proper justification of the line, said linecasting machine being controlled by an automatic operating attachment having a perforated tape signal input, said apparatus including spaceband releasing means for releasing spacebands of the selected size into a line of type assembled in said linecasting machine, a signal sensing head adapted to read said tape in advance of and at a speed exceeding the tape reading speed of said automatic operating attachment, said head being adapted to detect a signal in the form of a series of perforations in said tape indicating the termination of a line of type and the size of the additional spacebands to be inserted therein, a time delay circuit adapted to halt the tape reading function of said head a predetermined time after actuation of said delay circuit, a control unit adapted to actuate said delay circuit on the sensing of the first perforation in said series by said head and for retaining in a memory circuit the number of further perforation in said series, said control unit including spaceband relays having holding circuits and selectively energizable to control said spaceband releasing means, a sequencing unit including a series of switches sequentially operated in an operating cycle of said unit, means for initiating said operating cycle in response to completion of the assembly of a line of type in said linecasting machine, operation of said sequencing unit switches serving to sequentially: break the holding circuits of said spaceband relays, energize a selected one of said relays determined by the information retained in said memory circuit, clear said memory circuit of previously acquired information, and re-start the tape reading function of said head; switch means operated with each spaceband signal read by said automatic operating attachment to control said spaceband releasing means jointly with said spaceband relays, whereby said apparatus functions to insert additional spacebands in a line of type assembled in said linecasting machine with each spaceband signal read by said operating attachment.

4. An apparatus for automatically inserting additional spacebands of a selected size in a line of type assembled in a slug linecasting machine to assure proper justification of the line, said linecasting machine being controlled by an automatic operating attachment having a perforated tape signal input, said apparatus including electrically energized actuators cooperating with said linecasting machine for releasing spacebands of the selected size into the line assembly, a signal sensing head adapted to read said tape in advance of said automatic operating attachment, said head being adapted to detect a signal in the form of a series of perforations in said tape indicating the termination of a line of type and the size of the additional spacebands to be inserted therein, a control unit adapted to retain in a memory circuit the number of perforations in said series, said control unit including spaceband relays having holding circuits and selectively energizable to set up energizing circuits for one or the other of said electrically energized actuators, a sequencing unit including a series of switches sequentially operated in an operating cycle of said unit, means for initiating said operating cycle in response to completion of the assembly of a line of type in said linecasting machine, operation of said sequencing unit switches serving to sequentially: break the holding circuits of said spaceband relays, energize a selected one of said relays determined by the information retained in said memory circuit, and clear said memory circuit of previously acquired information; switch means operated with each spaceband signal read by said automatic operating attachment to complete the energizing circuit for the one of said actuators set up by the energized one of said spaceband relays, whereby said apparatus functions to insert additional spacebands in a line of type assembled in said linecasting machine with each spaceband signal read by said operating attachment.

5. An apparatus for automatically inserting additional spacebands of a selected size in a line of type assembled in a slug linecasting machine to assure proper justification of the line, said linecasting machine being controlled by an automatic attachment having a coded tape signal input, said apparatus including spaceband releasing means for releasing spacebands of the selected size into a line of type assembled in said linecasting machine, a signal sensing head adapted to read said tape in advance of said automatic operating attachment, said head being adapted to detect a series of signals on said tape indicating the termination of a line of type and the size of the additional spacebands to be inserted therein, a control unit adapted to retain in a memory circuit the number of signals in said series, said control unit including spaceband relays having holding circuits and selectively energizable to control said spaceband releasing means, a sequencing unit including a series of switches sequentially operated in an operating cycle of said unit, means for initiating said operating cycle in response to completion of the assembly of a line of type in said linecasting machine, operation of said sequencing unit switches serving to sequentially: break the holding circuits of said spaceband relays, energize a selected one of said relays determined by the information retained in said memory circuit, and clear said memory circuit of previously acquired information; switch means operated with each spaceband signal read by said automatic operating attachment to control said spaceband releasing means jointly with said spaceband relays, whereby said apparatus functions to insert additional spacebands in a line of type assembled in said linecasting machine with each spaceband signal read by said operating attachment.

6. An apparatus for automatically inserting additional spacebands of a selected size in a line of type assembled in a slug linecasting machine to assure proper justification of the line, the linecasting machine being controlled by an automatic operating attachment having a coded tape signal input, said apparatus including electrically energized actuators cooperating with said linecasting machine for releasing spacebands of the selected size into the line assembly, a tape reading head adapted to sense the spaceband selecting signals at the end of a line of type and receiving said tape ahead of said automatic operating attachment, a time delay unit for halting the signal sensing operation of said head a predetermined time after actuation of said time delay unit, a control unit including means for actuating said time delay unit, and information storing means for retaining an indication of the number of spaceband selecting signals appearing at the end of a line of type, a sequence unit actuated as said automatic operating attachment senses the end of the preceding line of type on said tape, said sequence unit being adapted upon actuation to (1) provide energizing circuits for said spaceband release actuators corresponding to information retained by said information storing means, (2) clear said information storing means, and (3) restart the signal sensing operation of said head for the reading of the next subsequent line of type, whereby the spaceband selecting signals appearing at the end of a line of type on said tape cause spacebands of the selected size to be added in the assembling of said line of type in said linecasting machine prior to the reading of said selecting signals by said automatic operating attachment.

7. An apparatus for automatically inserting additional spacebands of a selected size in a line of type assembled in a slug linecasting machine to assure proper justification of the line, the linecasting machine being controlled by an automatic operating attachment having a coded tape signal input, said apparatus including electrically energized actuators cooperating with said linecasting machine for releasing spacebands of the selected size into the line assembly, a tape reading head adapted to sense the spaceband selecting signals at the end of a line of type and receiving said tape ahead of said automatic operating attachment, a control unit including information storing means for retaining an indication of the number of spaceband selecting signals appearing at the end of a line of type, a sequence unit actuated as said automatic operating attachment senses the end of the preceding line of type on said tape, said sequence unit being adapted upon actuation to (1) provide energizing circuits for said spaceband release actuators corresponding to information retained by said information storing means, and (2) clear said information storing means for the next line of type to be read, whereby the spaceband selecting signals appearing at the end of a line of type on said tape cause spacebands of the selected size to be added in the assembling of said line of type in said linecasting machine prior to the reading of said selecting signals by said automatic operating attachment.

8. An apparatus for automatically inserting additional spacebands of a selected size in a line of type assembled in a slug linecasting machine to assure proper justification of the line, the linecasting machine being controlled by an automatic operating attachment having a coded tape signal input, said apparatus including spaceband releasing means for releasing spacebands of the selected size into a line of type assembled in said linecasting machine, a tape reading head adapted to sense the spaceband selecting signals at the end of a line of type and receiving said tape ahead of said automatic operating attachment, a time delay unit for halting the signal sensing operation of said head a predetermined time after actuation of said time delay unit, a control unit including means for actuating said time delay unit, and information storing means for retaining an indication of the number of spaceband selecting signals appearing at the end of a line of type, a sequence unit actuated as said automatic operating attachment senses the end of the preceding line of type on said tape, said sequence unit being adapted upon actuation to (1) control said spaceband releasing means in accord with information retained by said information storing means, (2) clear said information storing means, and (3) restart the signal sensing operation of said head for the reading of the next subsequent line of type, whereby the spaceband selecting signals appearing at the end of a line of type on said tape cause spacebands of the selected size to be added in the assembling of said line of type in said linecasting machine prior to the reading of said selecting signals by said automatic operating attachment.

9. A perforated tape reading head comprising a housing having means for conveying perforated tape over one surface thereof, a plurality of co-extensive selector levers pivotally mounted intermediate their ends within said housing, each of said levers carrying a pin adjacent one of its ends adapted to be moved into spaced perforations in the tape, notches formed in the other ends of said levers with the notches in all but one of said levers being horizontally aligned when said levers are disposed parallel to each other, means for angularly reciprocating said levers in unison about their pivotal mounting, a key movably mounted within said housing and spring biased toward the notched ends of said levers, a transfer switch mounted on said housing, and means operated by said key for actuating said transfer switch whenever said key enters the notches formed in said levers, whereby said transfer switch is actuated only when the pin carried by said one lever extends through a tape perforation and the pins of the other levers are prevented from extending through a perforation, the consequent alignment of the notches in the ends of all of said levers then permitting entry of said key therein.

10. A perforated tape reading head including means for conveying perforated tape through the head, a plurality of co-extensive selector levers pivotally mounted intermediate their ends, each of said levers carrying a pin adjacent one of its ends adapted to be moved into spaced perforations in the tape, notches formed in the other ends of said levers with the notches in all but one of said levers being horizontally aligned when said levers are disposed parallel to each other, means for angularly reciprocating said levers in unison about their pivotal mounting, a key movably mounted adjacent said levers and spring biased toward the notched ends thereof, a transfer switch, and means operated by said key for actuating said transfer switch whenever said key enters the notches formed in said levers, whereby said transfer switch is actuated only when the pin carried by said one lever extends through a tape perforation and the pins of the other levers are prevented from extending through a perforation, the consequent alignment of the notches in the ends of all of said levers then permitting entry of said key therein.

11. A perforated tape reading head including means for conveying perforated tape through the head, a plurality of co-extensive selector levers pivotally mounted in underlying relation to said tape, each of said levers carrying a pin adapted to be moved into spaced perforations in the tape, notches formed in said levers with notches in all but one of said levers being horizontally aligned when said levers are disposed parallel to each other, means for angularly reciprocating said levers in unison about their pivotal mounting, a key movably mounted adjacent said levers and spring biased toward the notched portions thereof, a transfer switch, and means operated by said key for actuating said transfer switch whenever said key enters the notches formed in said levers, whereby said transfer switch is actuated only when the pin carried by said one lever extends through a tape perforation and the pins of the other levers are prevented from extending through a perforation, the consequent alignment of the notches in all of said levers then permitting entry of said key therein.

12. A perforated tape reading head as claimed in claim 11 wherein the means for angularly reciprocating the selector levers includes a rotatable cam, a primary lever pivotally mounted adjacent one of its ends upon a supporting shaft, the other end of said primary lever being adapted to cooperate with said cam, a secondary lever generally coextensive with said primary lever and pivotally mounted on said supporting shaft, said secondary lever being adapted to engage said selector levers, a compression spring extending between said primary and secondary levers urging said levers apart, an adjusting screw carried by one of said levers and cooperating with the other of said levers to limit the distance said levers are moved apart by said compression spring, said primary and secondary levers being thereby moved in unison upon rotation of said cam, said compression spring taking up the motion of said cam when said secondary lever is locked against movement, the adjustment of said adjusting screw serving to vary the throw of said secondary lever.

13. A perforated tape reading head as claimed in claim 11 wherein the means for angularly reciprocating the selector levers includes a rotatable cam, a primary lever pivotally mounted upon a supporting shaft, means carried by said primary lever being adapted to cooperate with said cam, a secondary lever generally coextensive with said primary lever and pivotally mounted on said supporting shaft, said secondary lever being adapted to engage said selector levers, resilient means urging said primary and secondary levers apart, an adjustable abutment carried by one of said levers and cooperating with the other of said levers to limit the distance said levers are moved apart by said resilient means, said primary and secondary levers being thereby moved in unison upon rotation of said cam, said resilient means taking up the motion of said cam when said secondary lever is locked against movement, the positioning of said abutment serving to vary the throw of said secondary lever.

14. An apparatus for automatically applying corrective action to the operation of a machine controlled by an automatic operating means having a coded tape signal input, said apparatus including electrically energized actuators cooperating with said machine for providing said corrective action, a tape reading head adapted to sense a predetermined signal sequentially appearing on said tape and receiving said tape ahead of said automatic operating means, a control unit including information storing means for retaining information on the corrective action required, a sequence unit actuated as said automatic operating attachment senses said predetermined signal appearing on said tape, said sequence unit being adapted upon actuation to (1) provide energizing circuits for said actuators corresponding to information retained by said information storing means, and (2) clear said information storing means for the acceptance of the following predetermined signal, whereby each predetermined signal on said tape provides the required corrective action to said machine prior to the sensing of said predetermined signal by said automatic operating means.

No references cited.